US008458457B2

(12) United States Patent
Parkinson (10) Patent No.: US 8,458,457 B2
(45) Date of Patent: Jun. 4, 2013

(54) METHOD AND SYSTEM FOR CERTIFICATE REVOCATION LIST PRE-COMPRESSION ENCODING

(75) Inventor: Steven W. Parkinson, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 901 days.

(21) Appl. No.: 11/670,630

(22) Filed: Feb. 2, 2007

(65) Prior Publication Data

US 2008/0189545 A1 Aug. 7, 2008

(51) Int. Cl.
*H04L 9/00* (2006.01)
*H04L 9/32* (2006.01)

(52) U.S. Cl.
CPC .................... *H04L 9/3294* (2013.01)
USPC ........... 713/158; 713/155; 713/156; 707/693; 707/754; 707/755; 707/756; 380/30

(58) Field of Classification Search
USPC .......... 713/158, 155, 156; 707/693, 754–756
See application file for complete search history.

(56) References Cited

U.S. PATENT DOCUMENTS

| | | | | |
|---|---|---|---|---|
| 5,325,423 A * | 6/1994 | Lewis | | 379/93.08 |
| 5,535,290 A * | 7/1996 | Allen | | 382/250 |
| 5,682,441 A * | 10/1997 | Ligtenberg et al. | | 382/232 |
| 5,729,224 A * | 3/1998 | Hirayama et al. | | 341/59 |
| 5,793,868 A * | 8/1998 | Micali | | 380/28 |
| 5,815,703 A * | 9/1998 | Copeland et al. | | 1/1 |
| 6,044,462 A * | 3/2000 | Zubeldia et al. | | 713/158 |
| 6,301,394 B1 * | 10/2001 | Trout | | 382/244 |
| 6,487,658 B1 | 11/2002 | Micali | | |
| 6,604,106 B1 | 8/2003 | Bodin et al. | | |
| 6,724,737 B1 * | 4/2004 | Boyden et al. | | 370/316 |
| 6,941,312 B1 * | 9/2005 | Hoffman et al. | | 1/1 |
| 7,069,660 B2 * | 7/2006 | Robb et al. | | 33/203.16 |
| 7,117,360 B1 * | 10/2006 | Zhao | | 713/158 |
| 7,236,637 B2 * | 6/2007 | Sirohey et al. | | 382/240 |
| 7,274,671 B2 * | 9/2007 | Hu | | 370/256 |
| 7,365,658 B2 * | 4/2008 | Todorov et al. | | 341/63 |
| 7,685,292 B1 * | 3/2010 | Kinsella et al. | | 709/227 |
| 8,112,624 B2 | 2/2012 | Parkinson et al. | | |
| 2001/0027392 A1 * | 10/2001 | Wiese, Jr. | | 704/230 |
| 2002/0141422 A1 * | 10/2002 | Hu | | 370/408 |
| 2003/0005036 A1 * | 1/2003 | Mitzenmacher | | 709/203 |
| 2004/0210668 A1 * | 10/2004 | Garakani et al. | | 709/236 |
| 2005/0073579 A1 | 4/2005 | Lepine et al. | | |
| 2005/0120207 A1 | 6/2005 | Hines et al. | | |
| 2005/0138401 A1 * | 6/2005 | Terao et al. | | 713/189 |
| 2005/0163387 A1 * | 7/2005 | Sugita | | 382/232 |

(Continued)

OTHER PUBLICATIONS

Årnes, André, "Public Key Certificate Revocation Schemes," Thesis for Department of Telematics, Norwegian University of Science and Technology, Queen's University Kingston Ontario, Canada Feb. 2000.

(Continued)

*Primary Examiner* — Beemnet Dada
*Assistant Examiner* — Sayed Beheshti Shirazi
(74) *Attorney, Agent, or Firm* — Lowenstein Sandler LLP (57) ABSTRACT

Embodiments of the present invention provide a pre-compression encoding capability for encoding a CRL, such as an X.509 CRL, stored as a file, data structure or data object in a computer system having a certification authority (CA) and a security client prior to compression. An exemplary method provides for accessing the CRL contents and performing an encoding procedure.

27 Claims, 10 Drawing Sheets

U.S. PATENT DOCUMENTS

| | | | |
|---|---|---|---|
| 2005/0210121 A1* | 9/2005 | Taylor et al. | 709/218 |
| 2005/0228998 A1* | 10/2005 | Chan et al. | 713/175 |
| 2006/0132334 A1* | 6/2006 | Malvar | 341/50 |
| 2007/0118559 A1* | 5/2007 | Christiansen et al. | 707/104.1 |
| 2007/0143118 A1* | 6/2007 | Chen et al. | 704/500 |
| 2007/0233477 A1* | 10/2007 | Halowani et al. | 704/232 |
| 2008/0091698 A1* | 4/2008 | Cook et al. | 707/101 |
| 2008/0126378 A1 | 5/2008 | Parkinson et al. | |
| 2008/0152235 A1* | 6/2008 | Bashyam et al. | 382/224 |

OTHER PUBLICATIONS

U.S. Appl. No. 11/564,623, Method and System for Certificate Revocation List Compression, filed Nov. 29, 2006.

Housley, et al., "Internet X.509 Public Key Infrastructure Certificate and Certificate Revocation List (CRL) Profile," RFC 3280, Apr. 2002, 121 pages.

Telecommunication Standardization Sector of ITU (ITU-T), "Information Technology—Open Systems Interconnection—The Directory: Authentication Framework," ITU-T Recommendation X.509 (1997 E), Aug. 1997, 81 pages.

Red Hat Office Action for U.S. Appl. No. 11/564,623 mailed Mar. 4, 2011.

Red Hat Office Action for U.S. Appl. No. 11/564,623 mailed Oct. 18, 2010.

Red Hat Office Action for U.S. Appl. No. 11/564,623 mailed Jun. 25, 2010.

Red Hat Office Action for U.S. Appl. No. 11/564,623 mailed Nov. 17, 2009.

Red Hat Advisory Action for U.S. Appl. No. 11/564,623 mailed Sep. 1, 2010.

Red Hat Notice of Allowance for U.S. Appl. No. 11/564,623 mailed Oct. 5, 2011.

USPTO Office Action for U.S. Appl. No. 11/564,623 mailed Nov. 17, 2009.

USPTO Office Action for U.S. Appl. No. 11/564,623 mailed Jun. 25, 2010.

USPTO Office Action for U.S. Appl. No. 11/564,623 mailed Oct. 18, 2010.

USPTO Office Action for U.S. Appl. No. 11/564,623 mailed Mar. 4, 2011.

USPTO Notice of Allowance for U.S. Appl. No. 11/564,623 mailed Oct. 5, 2011.

Arnes, Andre, "Public Key Certificate Revocation Schemes," Thesis for Department of Telematics, Norwegian University of Science and Technology, Queen's University Kingston Ontario, Canada, Feb. 2000, 136 pages.

Housley et al., "RFC 3280: Internet X.509 Public Key Infrastructure Certificate and Certificate Revocation List (CRL) Profile," The Internet Society, 2002, 129 pages.

Lossless compression, huffman coding, lempei-ziv. In Microsoft Computer Dictionary. Microsoft Press 2002. 7 pages.

Paul Theo Gonciari, Bashir M Al-Hashimi, Nicola Nicolici, "Improving Compression Ratio, Area Overhead, and Test Application Time for System-on-a-Chip Test Data Compression/Decompression," 8 pages.

* cited by examiner

METHOD AND SYSTEM FOR CERTIFICATE REVOCATION LIST PRE-COMPRESSION ENCODING

FIELD

The present invention relates generally to security in complex heterogeneous processing environments and more particularly, to providing pre-compression encoding of a certificate revocation list (CRL) in a public key infrastructure (PKI) environment.

BACKGROUND OF THE INVENTION

In computer network environments, security systems based on PKI are gaining popularity as a way of providing security or enhancing existing security, particularly with regard to security for network connections. Generally speaking, a PKI is an arrangement of servers, clients, and specific information that passes between them, for the verification of user identities by one or more rusted third parties such as, for example, one or more Certification Authorities (CA). The specific information is referred to as a public key and is typically associated with or bound to a particular user or users.

The establishment of a public key is typically accomplished by security or PKI software executing at a central location, such as a server, and operating in a coordinated or sometimes uncoordinated fashion with software at client locations. The public keys are typically provided within security certificates specified under, for example, the PKI Working Group (PKIX) of the Internet Engineering Task Force (IETF), which implement certificate standards based on the International Telecommunication Union-Telecommunication Standardization Sector (ITU-T) Recommendation X.509 ITU-T Recommendation X.509 (1997 E): Information Technology—Open Systems Interconnection—The Directory: Authentication Framework, June 1997 also specified in Comité Consultatif International Téléphonique et Télégraphique (CCITT), Geneva, 1989, Data Communication Networks: Directory, Recommendation X.500-X.521, Blue Book, Volume VIII-Fascicle VIII.8 and International Standards Organization/International Engineering Consortium (ISO/EC), 25 Dec. 1991, Information Technology—Open Systems Interconnection—The Directory: Authentication Framework, ISO/IEC 9594-8 (CCITT Recommendation X.509). The PKIX further specifies additional aspects in connection with request for comments (RFC) 3280, Housley, R., et al., "Internet X.509 Public Key Infrastructure: Certificate and Certificate Revocation List (CRL) Profile", RFC 3280, April 2002 (supersedes RFC 2459).

Using a PKI, network communications between, for example, a server and a client can be protected such as with a secure socket layer (SSL) connection between the server and client. Originally, SSL was privately developed as a way to provide a secure connection between an Internet web server and a browser operating on a client and has now been adopted as an open security standard by IETF. To operate in a PKI environment, a server wishing to communicate with a client or other network nodes needs to obtain a certificate for validating its identity to the client or other nodes and for allowing an encryption key to be generated for the establishment of the SSL connection. When the client and server first make a connection, the certificate is received by the client and the issuing CA is compared with a root CA certificate stored locally on the client. If the root CA matches the issuing CA then the certificate can be considered trusted. Otherwise a notification can be provided to the client that additional verification steps should be taken to ensure that the server can be "trusted."

A typical certificate contains the name of the server or other entity that is being identified, the server's public key, the name of the issuing CA, and other information including validity dates and cryptographic information proving that the certificate is authentic, and the serial number of the certificate. Over time, it will be appreciated that the security environment can change, and as different servers are encountered and respective certificates are accumulated, the need may arise to notify a client that a certificate is no longer valid and has been revoked. Since certificates are issued in an open ended fashion, that is once the certificates are generated, the client will have continued possession of the certificate, a separate notification must be provided that indicates the current status of the certificates issues by a particular issuing authority or CA. Such a notification can be provided in various forms including a list from the CA referred to as a certificate revocation list (CRL).

To further facilitate security, the CA periodically issues the CRL, which contains a list of revoked certificates and other information, such as information regarding the date the CRL was generated and the date of the next update for the CRL. The contents of the CRL and management of the CRL is specified in X.509 and RFC 3280, for example, as noted above. In some cases the contents of the CRL can include various extensions for providing additional information including reasons for revocation and the like. Depending on the scale of operation for a particular client the number of certificates handled can be large and, depending on the number of extensions in use, the size of each CRL entry with extensions can be large.

Difficulties arise when large numbers of entries associated with revoked certificates including information associated with extensions, are included in a CRL, which must be transferred to a client or other entity or a series of clients or entities. As updates are generated more frequently, the bandwidth requirements associated with transferring the CRL over the communication channel between the server and the client become increasingly large. One approach is to issue and transfer a so-called delta CRL, that is, a CRL containing information associated with certificates that have been revoked since the issuance of the last CRL. The delta CRL and the base CRL together provide comprehensive information regarding certificate revocation status. Such a system is described in U.S. Patent Application Publication No. US 2005/0120207 A1.

In other systems, such as those described in "Public Key Revocation Schemes," Årnes, Queen's University, Kingston, Ontario, Canada, February 2000, and U.S. Pat. No. 6,487,658, "EFFICIENT CERTIFICATE REVOCATION," issued on Nov. 26, 2002 to Micali, portions of information associated with a certificate in a CRL, such as a date field, are encoded or in some cases compressed to reduce the size of the field marginally reducing the number of bits needed to represent the field data. Further, the CRL is segregated or segmented such that information regarding certificates associated with a specific distribution point can be separately requested and provided. Aside from these minimal measures, Micali abandons the traditional CRL in favor of alternative constructs based on individual queries to the CA.

Although such approaches can provide marginal reductions in some of the data elements, as the size of the CRL grows, the impact of the marginal reduction in certificate size is reduced relative to the size of the entire CRL. Further, at some point, the base CRL must be transferred and, if the number and scope of updates becomes extensive, along with the number of Delta CRLs, the management of the CRL becomes complex and, while possibly reducing bandwidth requirements for updates, consumes an increasing quantity of processing resources and an increasing quantity of time. It would be desirable therefore to provide a CRL management capability in a computer system environment that could improve PKI performance by reducing bandwidth requirements for CRL transfers.

While a general background including problems in the art are described hereinabove, with occasional reference to related art or general concepts associated with the present invention, the above description is not intending to be limiting since the primary features of the present invention will be set forth in the description which follows. Some aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide methods and systems for filtering and compressing an entire CRL with an out-of-band indication that the CRL is compressed and the type of filtering procedure used, or for filtering and compressing CRL contents, which preferably include a sequence of compressed certificate serial numbers and optional extensions associated with revoked certificates, while maintaining an uncompressed header having information associated with the contents such as filtering and compression method, location of individual information associated with the revoked certificates within the compressed portion of the CRL, and the like.

In an exemplary method of encoding a certificate revocation list (CRL) for preparing the CRL for compression in a computer system having a certification authority (CA), the CRL ca be stored as a first data object associated with the CA. The CRL can have one or more certificates including a respective serial number of the one or more certificates. The first data object can be opened to access the contents thereof including the one or more certificates. An encoding procedure is then performed on at least a portion of the contents including the one or more certificates of the first data object to form an encoded CRL. The encoded CRL can be stored in a second data object associated with the CA such that compression can subsequently be performed in a more efficient manner with the potential for achieving greater compression ratios.

Reference will now be made in detail to exemplary embodiments of the invention, which are illustrated in the accompanying drawings. Wherever possible, the same reference numbers will be used throughout the drawings to refer to the same or like parts.

Figure 1:
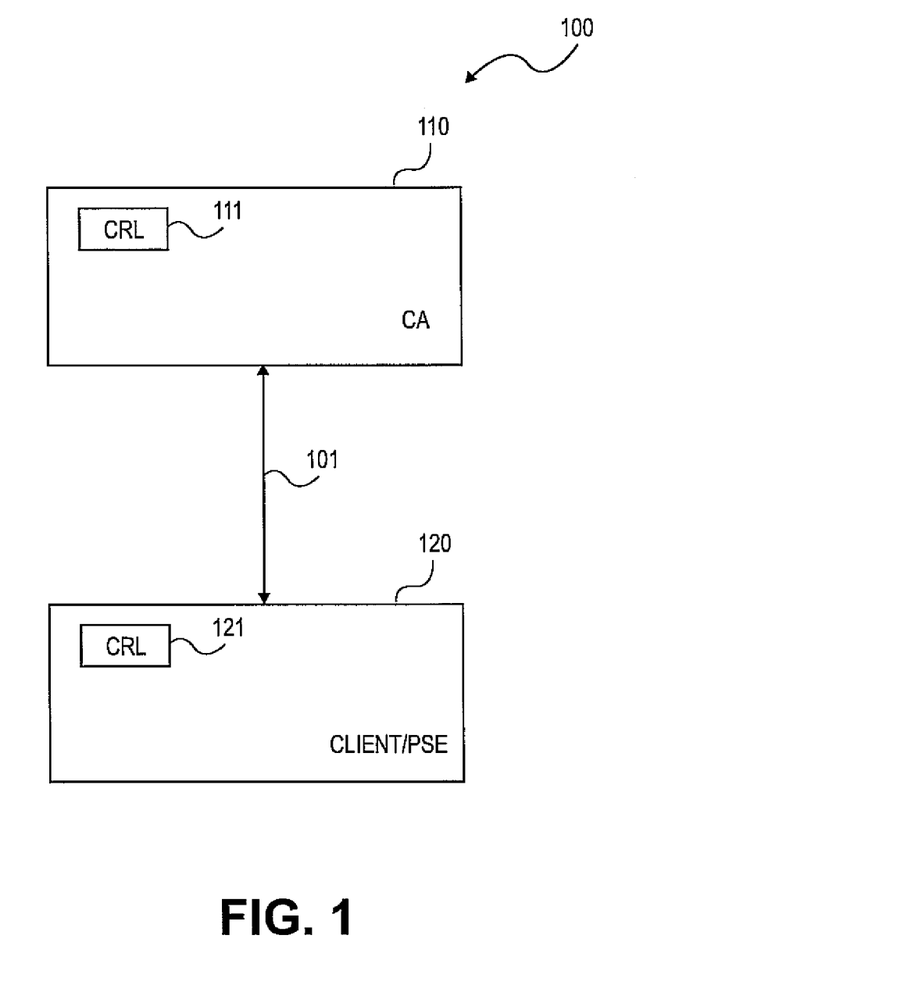
FIG. 1 is a diagram illustrating exemplary components of a computer system consistent with embodiments of the present invention.

Referring now to FIG. 1, a simplified and representative PKI environment 100 associated with a computer system will be discussed and described. The basic representative environment includes a certification authority (CA) 110, which will also be referred to herein as a server or certificate server or will be referred to as working in connection with a server or certificate server, and also includes a security client 120, which can also be referred to as a personal security environment (PSE). It will be appreciated that the CA 110 and the security client 120 can be of the kind specified under X.509 as cited above, or can be of another type provided that they use certificates, CRLs and the lice. In a typical interaction between the CA 110 and the security client 120, a new version of a CRL, such as CRL 111 and will be generated during operation, such as after a certain number of new certificates are generated, and will be transferred to the security client 120 over a network connection 101 where it can be stored, for example, as CRL 121.

It will be appreciated that the transfer of the CRL 111 can include a streaming transfer of the contents of CRL 111, which could include a data structure or data object, a direct transfer of a file, a block transfer of the CRL contents, or the like. It should be noted that in a conventional PKI environment CRL 111 and CRL 121 will generally have the same contents. However, they are referred to separately for illustrative purposes to exemplify that, at least at certain times, the contents of CRL 111 will differ from CRL 121, such as before an update is transferred to the security client and to further exemplify that if CRL 111 is generated by CA 110 as streaming data, the contents are transferred and a separate data structure, data object, file or the lice, will be needed, such as CRL 121, to accommodate and store the streaming content. The network connection 101 can be a wired or wireless network connection such as a connection to the Internet, private network or the like.

The CA 110 can further access information stored remotely in various external data systems (not shown) provided a proper interface exists to the external data systems that may be part of the larger PKI environment. It will be appreciated that the CA 110 may be a general purpose computer or dedicated computing platform configured to execute secure and/or unsecure (or open) applications through an operating system (not shown). The CA 110 may be implemented with general purpose server platforms as known to those skilled in the art from Intel, Advanced Micro Devices, Hewlett-Packard, and/or others or can be implemented with other custom configured server architectures. Similarly the security client 120 can include a general purpose computer or dedicated computing platform configured to execute secure and/or open applications through an operating system or can operate through an independent operating system or independent version of the operating system of CA 110. The security client 120 can include a personal computer, a workstation, or other similar computing platform.

Figure 2:
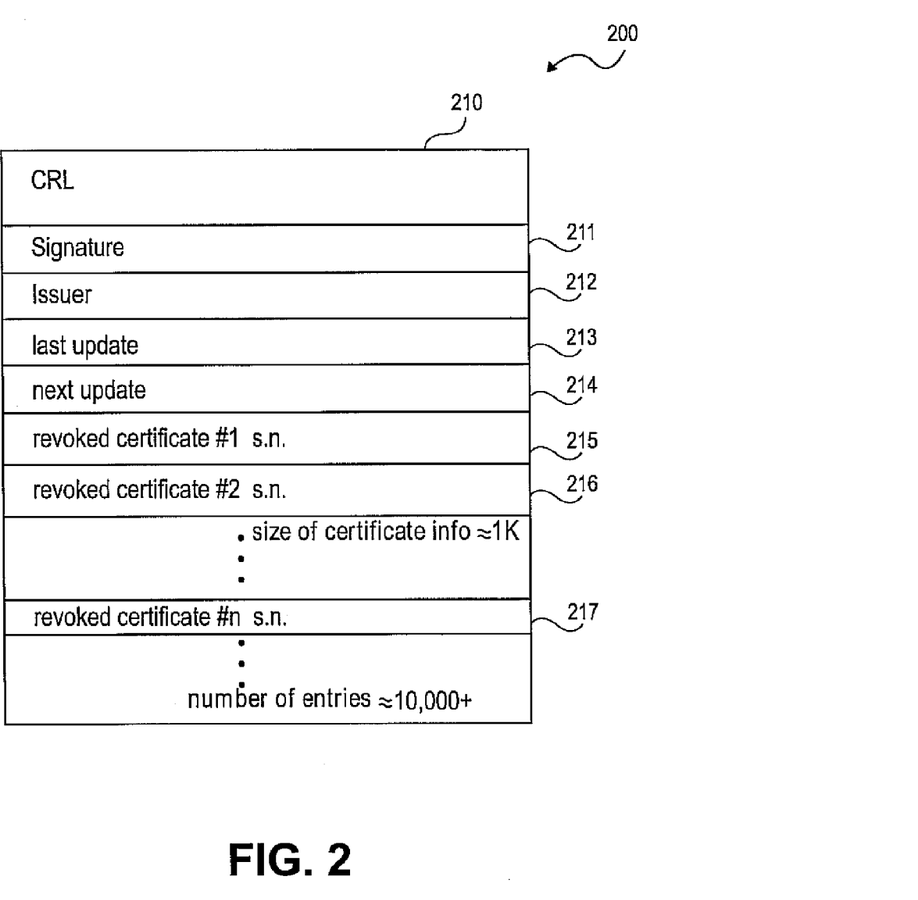
FIG. 2 is a diagram illustrating an exemplary certificate revocation list (CRL) and contents consistent with operation in accordance with the present invention.

A typical CRL, such as CRL 111 and CRL 121, described in connection with FIG. 1 is shown and described in greater detail in connection with FIG. 2. In exemplary environment 200, a CRL 210 is shown and illustrated with its typical contents. The CRL 210 typically includes a digital signature 211 of an issuer identified as an issuer 212, and additional information as will be described. The CRL 210 contains a list of serial numbers associated with revoked certificates such as revoked certificate serial number 1 215, revoked certificate serial number 2 216 through revoked certificate serial number n 217. The revoked certificates are no longer valid, and should not be relied upon by, for example, security client 120. It should be noted that in accordance with in RFC 3280, different revocation reasons are defined. For example, a certificate can be irreversibly revoked if the issuing CA improperly issued the certificate or a private-key associated with the certificate or the entity associated with the certificate is thought to have been compromised. A certificate may also be revoked if the corresponding CA is determined to have failed to comply with, for example, policy requirements such as publication of fraudulent or malicious information or code, misrepresentation, or other violation as determined by the CA, a service provider or operator associated with the corresponding CA or its customer. It will be appreciated that a common reason for revocation is compromise of a private key such as when a token, smart card or the like containing the private key has been lost or stolen.

A certificate can be temporarily and reversibly invalidated, such as when a user is uncertain and suspects that the private key has been lost, such as in the case where a card or token has been misplaced. If the card or token having the private key is located and it is determined that the private key has not been compromised, the certificate can be reinstated, and the certificate will be removed from subsequent CRLs issued by the CA.

The CRL 210 further contains a last update field 213 and a next update field 214. It will be appreciated that CRL 210 can be generated periodically after the expiration of a time period or at a particular time, which will be reflected in the value associated with the next update field 214. CRL 210 can alternatively be generated immediately after a certificate has been revoked. It should be noted that CRL 210 will be issued by the CA issuing the certificates identified therein. During the valid timeframe specified by the last update field 213 and the next update field 214, CRL 210 can be consulted to verify a certificate associated with a node prior to connecting to the node by, for example, a PKI-enabled application executing on security client 120 or other PKI network node. To validate CRL 210 prior to relying on its contents, a separate certificate associated with its issuing CA is should be obtained. It should be noted that the use of CRLs such as CRL 210 is important since, as will be appreciated, by relying exclusively on certificate expiration dates, security problems that occur when the certificate is valid may not be immediately discovered leaving a time window during which unauthorized activity can occur. Therefore, the status of certificates is routinely checked through the use of CRLs before they can be trusted. The certificates for which CRL 210 is maintained are certificates that comply with X.509/public key standard.

To effectively operate in a PKI environment, access to the most current version of CRL 210 is required. In a typical scenario, on-line validation through network access to the CRL is used. However, the process of on-line access to CRLs operates against the self authenticating character of the certificate can involves excessive bandwidth. For example, given that the typical entry size for information associated with a certificate, such as serial number and optional extension, is around 1 Kbyte, and given that the number of entries of certificate information can exceed 10,000, a large CRL can be 10 Mbyte or larger requiring a significant amount of transfer time for a computer associated with the typical security client. Some alternatives to CRLs exist such as the on-line certificate validation protocol known as the Online Certificate Status Protocol (OCSP). OCSP has the primary benefit of requiring less network bandwidth and thus enabling real-time and near real-time status checks for high volume or high value operations. However, for client requiring frequent certificate validation, OCSP can give rise to inefficiencies that would not be encountered if the client had local access to a CRL. Thus, to address bandwidth issues and other issues, the present invention involves compressing a CRL prior to transfer to reduce the amount of information and thus the bandwidth requirements for the network connection.

Figure 3:
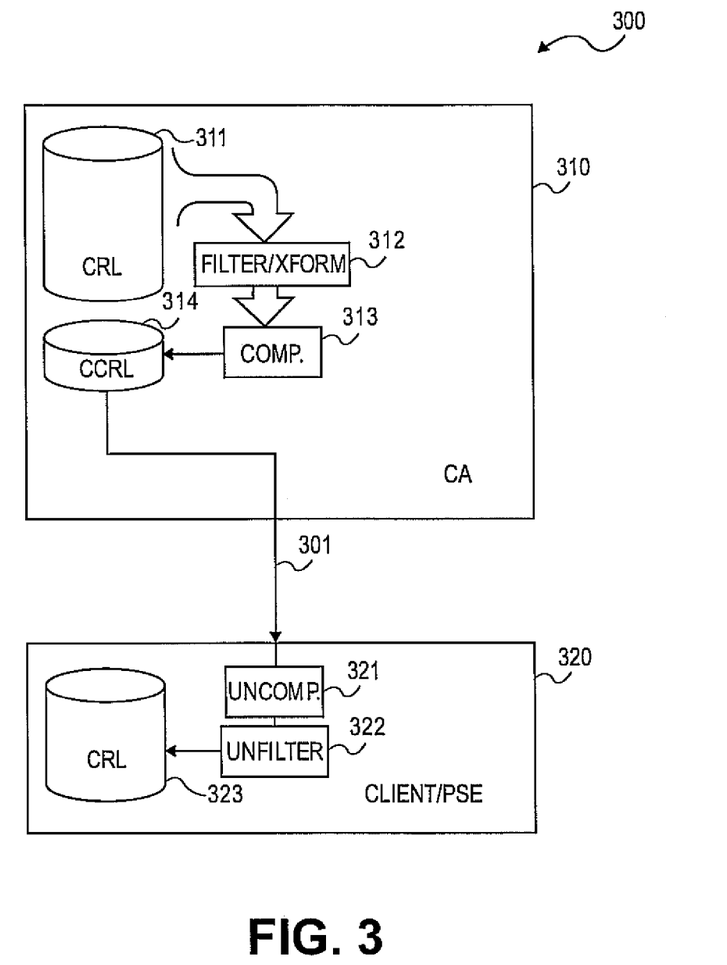
FIG. 3 is a diagram illustrating CRL filtering and compression in an exemplary certification authority (CA) and un-compression and un-filtering in a security client in accordance with embodiments of the present invention.

In accordance with various embodiments, an exemplary compression scenario 300 is illustrated in FIG. 3. A certificate authority (CA) 310 can include a CRL 311 having information such as revoked certificates as described, for example, in connection with FIG. 2. CA 310 further can be provided with a filter/xform unit 312, which is shown as an element of CA 310. The filter/xform unit 312 filters the CRL 311 and passes an output to compression unit 313, which is shown as an element of CA 310. One of ordinary skill will appreciate that the compression unit 313 is representative of a compression procedure or a device that accomplishes compression. In some instances, the compression unit 313 can be a dedicated compression controller or the like or can be implemented in a dedicated or general purpose processor or series of processors running a corresponding compression routine or procedure. The compression unit 313, after operating on the contents of the CRL 311 can generate a compressed CRL (CCRL) 314 which can be separately stored and passed over a network connection 301 to a security client 320.

The security client 320 can be provided with a corresponding uncompression unit 321 that can perform a reverse compression operation. The uncompression unit 321 is representative of an uncompression procedure related to the compression procedure associated with compression unit 313 or can be a device that accomplishes the uncompression. In some instances, the uncompression unit 321 can be a dedicated controller or the like or can be implemented in a dedicated or general purpose processor or series of processors running a corresponding uncompression routine or procedure. The uncompression unit 321, after operating on the CCRL 314 passed over network connection 301 can pass an output to an unfilter unit 322, which can unfilter the output to generate CRL 323 which can be separately stored and should match the original CRL 311. It is important to note that the compression associated with compression unit 313 should be a lossless compression.

In accordance with various embodiments, the compression procedure will be a lossless compression procedure such that important information associated with the certificates and other CRL contents will not be lost or corrupted. It will be appreciated by one of ordinary skill that lossless data compression preserves the exact original data during uncompression of the compressed data. An exemplary compression procedure must use lossless compression since the original contents of the CRL and the decompressed CRL must be identical. Many lossless compression procedures are available and can be adapted for use in connection with the present invention. For example, some image file formats such as PNG, use only lossless compression. While PNG is typically used for images, it can be used for text only as would be the case for example in compressing a CRL.

While typical compression sources include text, images, and sound, and in general, any general-purpose lossless compression procedure can be used on any type of data, many procedures achieve significant compression based on the type of data the procedures are designed to operate on and the nature of the data itself, for example, as highly correlated or highly uncorrelated. Sound data, for example, being typically uncorrelated, is compressed poorly with conventional compression procedures oriented to text.

A typical lossless compression procedure uses two different basic approaches. In one basic approach, a statistical model for the input data is generated and in another basic approach, input data is mapped into certain bit strings such that data having a high frequency occurrence will produce shorter output than data occurring less frequently. However, it will be appreciated that in the present invention since CRL contain text data or binary data, lossless compression procedures using statistical modeling can be used. Such procedures can include for example, a Burrows-Wheeler transform, which involves block sorting or preprocessing to make compression more efficient, Lempel-Ziv (LZ) 1977 (LZ77), Lempel-Ziv 1978 (LZ78), Lempel-Ziv-Welch (LZW). Other compression procedures can include encoding algorithms to produce compact bit sequences such as Huffman coding, arithmetic coding.

In an exemplary Burroughs-Wheeler procedure, the order of the data elements in a block of data associated with the CRL is changed. If the original block of data elements of the CRL includes data elements occurring with high frequency, then the compressed block of CRL data will include several places where a single data element is repeated multiple consecutive times. By rearranging the CRL data into series of repeated data elements, subsequent compression by procedures such as move-to-front transform and run-length encoding can operated with greater ease.

The Lempel-Ziv 1977 (LZ77) compression procedure replaces portions of CRL data with references to data already having passed through both an encoder and a decoder and that matches the CRL data portions. Each reference to a match is represented by a value referred to as a length-distance pair "l-d". The length-distance reference signifies that each of the next "l" characters is equal to the character exactly "d" characters behind it in the uncompressed data. The LZ77 encoder and decoder both a block of the most recent data, such as a 2 KB, 4 KB, or 32 KB block or the like. The data is maintained in a data structure commonly referred to as a sliding window. It will be appreciated that the data structure is crucial for the encoder to look for and process matches, while the decoder interpret matches marked by the encoder. It will be appreciated that while all LZ77 procedures use the same basic principles, the encoded data output can vary widely. While the LZ77 procedure operates on data already processed, the LZ78 procedure scans the input buffer and matches data against a data dictionary. The location of the matched word in the dictionary, if one is available, can be output along with the match length. If no match is found, a length associated with the character that caused a match failure is output and the unmatched word can be added to the dictionary.

In the LZW compression procedure, the data that is being compressed is used to build a string translation table mapping fixed-length codes to strings. The codes are typically 12-bits long. The string table can be filled with single-character strings during initialization. A typical table size is 256 entries in the case of 8-bit characters. During text parsing by the compression procedure, every unique two-character sting can be stored in a table as a code/character. The code of code/character maps to the first character. When a string is read that has previously been encountered, the longest of any previously-encountered strings is determined, and the corresponding code is appended with the next character in the input and stored in the table. The code for the previously-encountered string is outputted and the extension character is used as the beginning of the next string. For uncompression in connection with the LZW procedure, an identical string table can be built using the compressed text as input. One of ordinary skill will appreciate that some exceptions may exist, which can easily be compensated for.

In other embodiments, Huffman coding can be used to provide a compression procedure for the CRL. Huffman coding is a lossless compression procedure and is a type of entropy encoding where a symbol such as a character is assigned a variable-length code based on the estimated probability of occurrence for each possible symbol value. Huffman coding is a prefix-free code where common characters are coded using relatively short code and less common symbols have longer codes. When the actual numeric frequencies of occurrence of symbols match the code frequencies, Huffman coding produces the smallest compressed size. In the case where the individual symbol frequencies of a set of symbols has a uniform probability distribution and a number of symbols in the set is a power of two, Huffman coding effectively reduces to simple binary block encoding.

In still other embodiments, arithmetic coding can be used as a compression procedure. Arithmetic coding is a form of entropy coding and produces a highly optimal compression result for a set of symbols and corresponding probabilities. In arithmetic coding a data model is generated such as by predicting the symbol patterns of the text to be compressed.

The choice of compression procedure can depend on considerations of the content of the data associated with the CRL. For example, unlike other forms of coding, arithmetic coding does not require an integer number of bits for encoding each source symbol and therefore generally can provide a higher compression capability. LZW coding can often be a good choice for good efficiency when the input symbols are not distributed independently in the source data, since LZW does not individually encode each input symbol. The efficiency of Huffman coding for example, depends heavily on having a good estimate of the true probability of the value of each input symbol.

In accordance with other exemplary embodiments, a scenario including a CA and a security client encompasses compression of CRL contents, which are preferably a compressed certificate serial numbers and optional extensions associated with revoked certificates and maintenance of a header that is uncompressed. The CA can generate a CRL of the kind described for example in connection with FIG. 2. The CRL preferably has at least one revoked certificate including a serial number and any extension. The CRL can be passed to a compression unit, which in the present embodiment will perform a compression on the contents of the CRL and will generate an uncompressed header HDR and compressed contents CCONT, which as noted is preferably at least one of compressed certificate serial numbers and optional extensions associated with revoked certificates. It will be appreciated that without the HDR, a requesting client could not ordinarily determine that the CRL was compressed and would likely not recognize the CRL as having compressed contents CCONT. Therefore, the HDR and the CCONT can be separately processed by a compression unit and combined for transfer over a network connection to a security client, which as will be appreciated can be a PSE or the like. The HDR must contain information such as what type of compression procedure was used to compress the CCONT and must also include other information necessary to allow the security client to determine the location of certificate information when the contents are uncompressed. The extension used to contain such information must also be marked as critical such that if a relying party cannot interpret the extension, the certificate validation associated with the corresponding CRL will fail as specified, for example in accordance with RFC 3280, section 5.3. Alternatively, contents associated with each certificate can be compressed individually, whereupon the header information can be used to identify, for example, the locations of compressed records within the CCONT.

The HDR and the CCONT are received as a data object, which can be a data structure, data object, file or the like as will be appreciated. The security client has the ability through a processor, controller, or the like configured with additional processing blocks or units for handling the data object. For example, the header portion of the data object can be read whereupon it will be apparent that the contents portion of the data object are compressed. If the header contains additional information such as a location index of compressed contents, portions of the compressed contents can be directly accessed. The compressed contents are uncompressed in an uncompression block so that the revoked certificates can be identified and any transactions based on one or more of the revoked certificates can be handled accordingly by the security client in accordance with PKI practice.

Figure 4A:
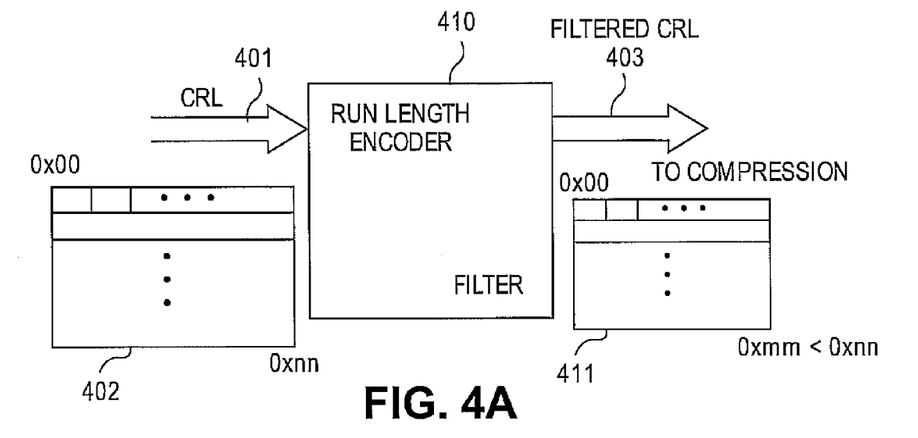
FIG. 4A is a diagram illustrating pre-compression filtering of CRL contents by run length encoding in accordance with embodiments of the present invention.

FIG. 4A is a diagram illustrating pre-compression filtering of CRL contents by run length encoding in accordance with embodiments of the present invention. In FIG. 4A a CRL 401 with contents 402 is input to a run length encoder 410, which outputs a filtered CRL 403 with contents 411.

Figure 4B:
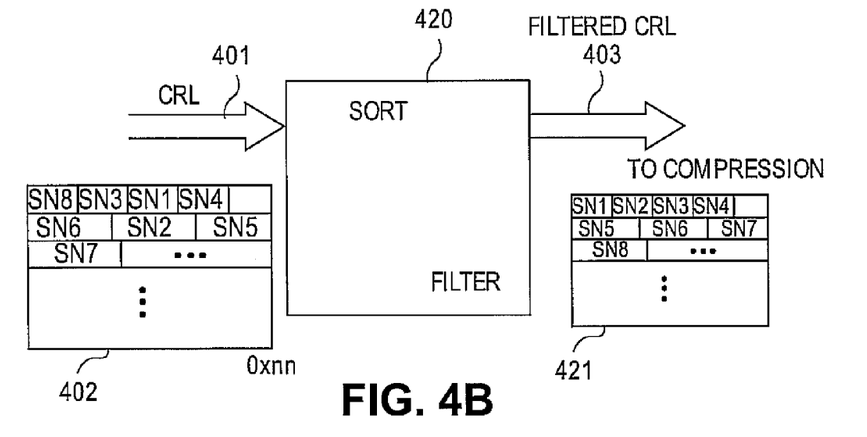
FIG. 4B is a diagram illustrating pre-compression filtering of CRL contents by sorting in accordance with embodiments of the present invention.

FIG. 4B is a diagram illustrating pre-compression filtering of CRL contents by sorting in accordance with embodiments of the present invention. In FIG. 4B, a CRL 401 with contents 402 is input into a sort filter 420, which outputs a filtered CRL 403 with contents 421.

Figure 4C:
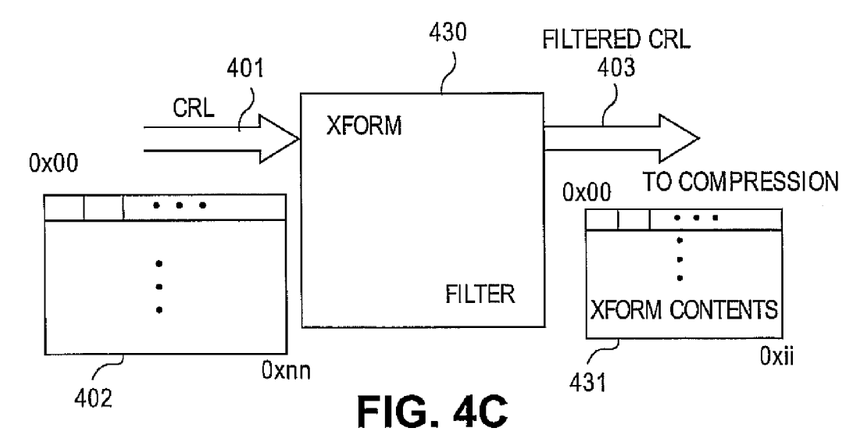
FIG. 4C is a diagram illustrating pre-compression filtering of CRL contents by a transform in accordance with embodiments of the present invention.

FIG. 4C is a diagram illustrating pre-compression filtering of CRL contents by a transform in accordance with embodiments of the present invention. In FIG. 4C, a CRL 401 with contents 402 is input into an xform filter 430, which outputs a filtered CRL 403 with xform contents 431.

Figure 4D:
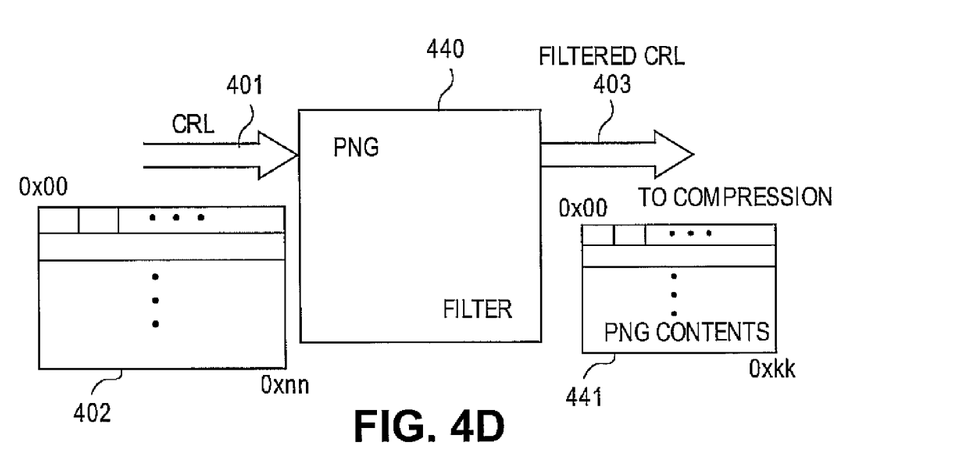
FIG. 4D is a diagram illustrating pre-compression filtering of CRL contents by a portable network graphics (PNG) procedure in accordance with embodiments of the present invention.

FIG. 4D is a diagram illustrating pre-compression filtering of CRL contents by a portable network graphics (PNG) procedure in accordance with embodiments of the present invention. In FIG. 4D, a CRL 401 with contents 402 is input into a PNG filter 440, which outputs a filtered CRL 403 with PNG contents 441.

Figure 4E:
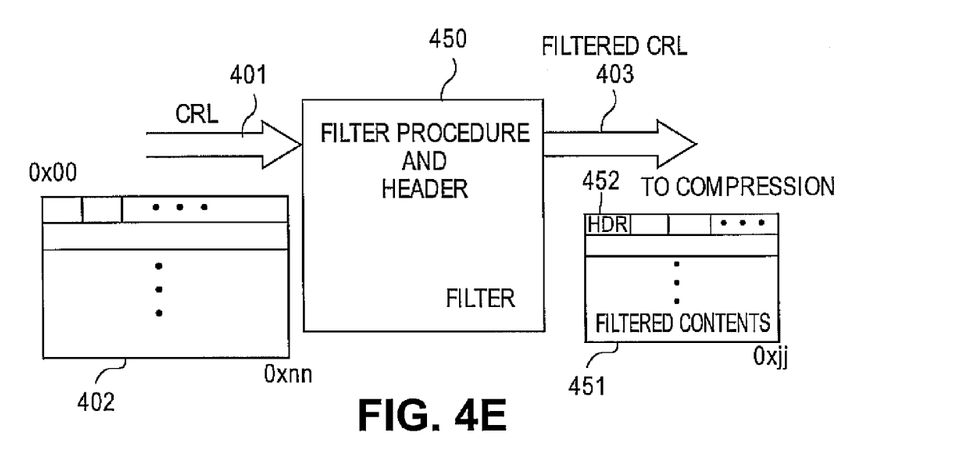
FIG. 4E is a diagram illustrating pre-compression filtering of CRL contents by a filter procedure including a header in accordance with embodiments of the present invention.

FIG. 4E is a diagram illustrating pre-compression filtering of CRL contents by a filter procedure including a header in accordance with embodiments of the present invention. In FIG. 4E, a CRL 401 with contents 402 is input into a filter 450, which outputs a filtered CRL 403 with filtered contents 451 and a header (HDR) 452.

Figure 5A:
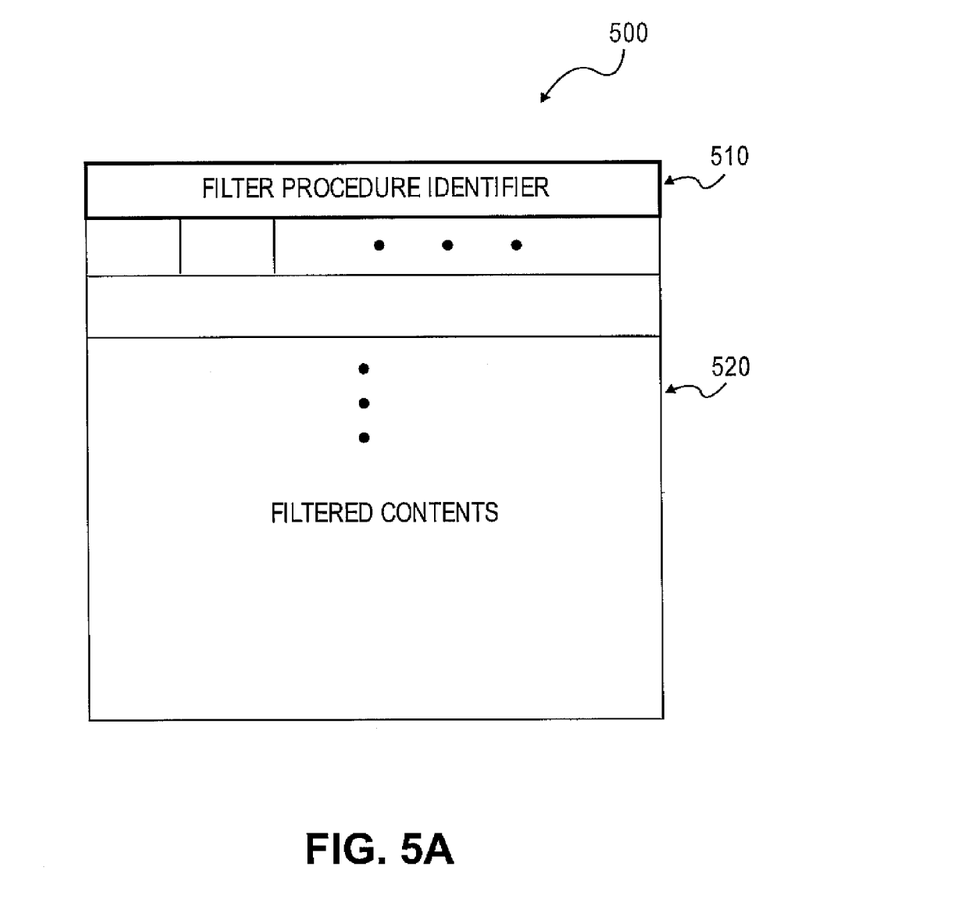
FIG. 5A is a diagram illustrating an exemplary filter procedure identifier and filtered contents in accordance with embodiments of the present invention.

FIG. 5A is a diagram 500 illustrating an exemplary filter procedure identifier 510 and filtered contents 520 in accordance with embodiments of the present invention.

Figure 5B:
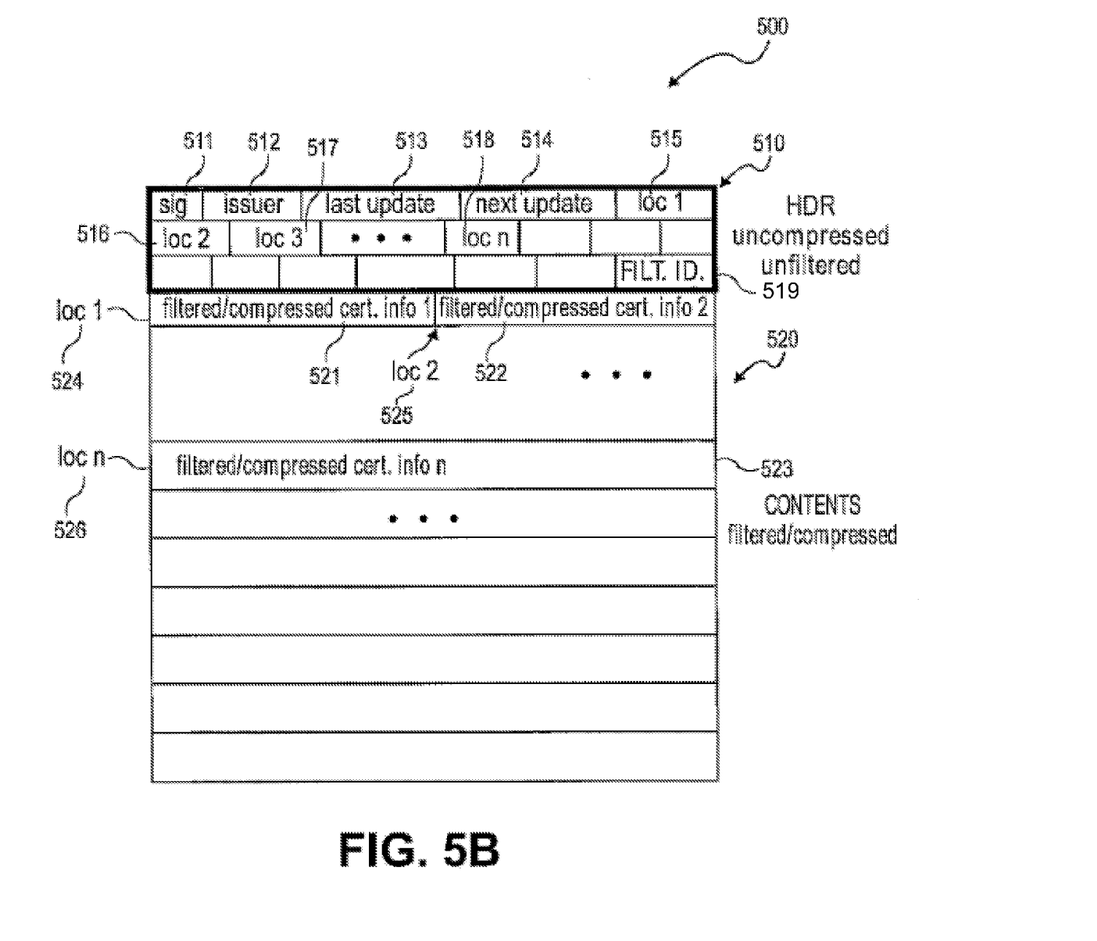
FIG. 5B is a diagram illustrating an exemplary unfiltered and uncompressed header and filtered and compressed contents in accordance with embodiments of the present invention.

FIG. 5B is a diagram illustrating an exemplary unfiltered and uncompressed header and filtered and compressed contents in accordance with embodiments of the present invention. To better appreciate the possible contents of an exemplary HDR, FIG. 5B shows an exemplary combined data object in scenario 500, where an uncompressed/unfiltered HDR 510 and a filtered/compressed CONTENTS portion 520 are shown. It should be noted that the contents of CONTENTS portion 520 are preferably at least one or a sequence of filtered/compressed serial numbers and optionally other information associated with revoked certificates. The HDR 510 can contain normal information associated with the underlying CRL such as the signature 511, the issuer identity 512, the last update date 513, the next update date 514, and the like, including an indication of the kind of compression that is used. The HDR 510, in a simple illustrative embodiment where individual certificate information entries are compressed perhaps with a variable length, can include for example, location information of the individual entries such as loc 1 515 for the location of the first entry, loc 2 516 for the location of the second entry, loc 3 517 for the location of the third entry and so on, with loc n 518 representing the location of the $n^{th}$ entry. Correspondingly, the CONTENTS portion 520 contains a filtered/compressed entry associated with revoked certificate information such as a filtered/compressed certificate info. 1 521, a filtered/compressed certificate info. 2 522, and so on up to a filtered/compressed certificate info. n 523. The actual locations such as index locations of the filtered/compressed entries 521-523 associated with revoked certificate information is at loc 1 524, loc 2 525 and loc n 536. The HDR 510 can also include a filter ID 519 to indicate the type of filter used in the CONTENTS portion 520.

Figure 6:
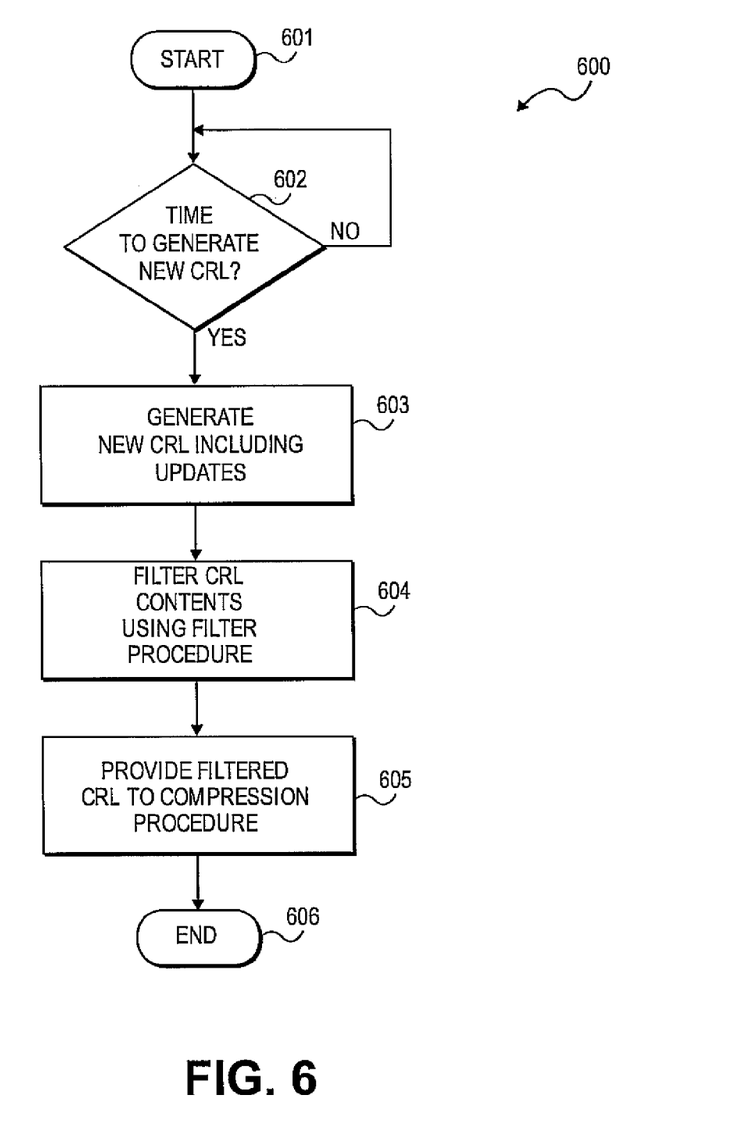
FIG. 6 is a flow chart illustrating an exemplary procedure for filtering CRL contents to facilitate compression in accordance with the present invention.

An exemplary scenario 600 shown in FIG. 6 shows various procedures that can be used to accomplish CRL compression in accordance with the invention. After start at 601, it can be determined at 602 whether an appropriate time has been reached for generation of a new CRL. Such a time could include a time reflected, for example, in the next update field or can be a time when a new certificate has been generated or the like. Such a time can also include when a specific request has been made by a security client for a CRL. If it is determined that a new CRL should be generated, then a new CRL can be generated at 603. It will be appreciated that, when referring to CRL, reference can be made in accordance with the present invention to a base CRL or a delta CRL. In the case where a delta CRL is generated or requested, it should be assumed that a recipient or a requester, such as an exemplary security client, also has previously requested and has the corresponding base CRL. After the CRL is generated, that is, after all the information for the certificates that have been revoked since the generation of the last update, the CRL can be filtered using a filter procedure at 604. The filtered CRL can be compressed entirely at 605 using a compression procedure such as a lossless compression procedure as described above. The CRL can then be provided to a security client over a connection such as a network connection based on a request or, alternatively based on a periodic schedule such as that reflected in the last update/next update fields. While the exemplary procedure is indicated as ending at 606, it will be appreciated that all or portions of the procedure can be performed or repeated on an as-needed basis depending, for example, on the number of certificates revoked, the frequency of revocation and the like.

Figure 7:
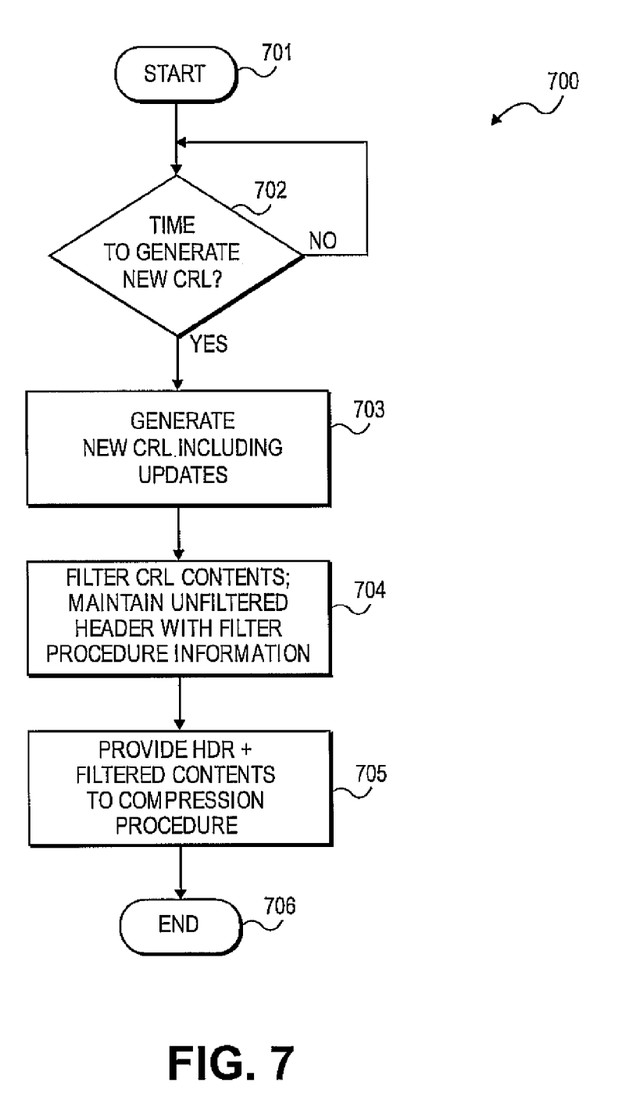
FIG. 7 is a flow chart illustrating an exemplary procedure for filtering CRL contents and maintaining an unfiltered header in accordance with the present invention.

In connection with embodiments involving the compression of CRL contents and maintenance of a header, an exemplary scenario 700 is shown in FIG. 7 with various procedures for accomplishing such compression. After start at 701, it can be determined, for example, at 702 whether an appropriate time has been reached for generation of a new CRL. As noted above, the time to generate a new CRL could include a time reflected, for example, in the next update field or can be a time when a new certificate has been generated or the like. Such a time can also include when a specific request has been made by a security client for a CRL. If it is determined that a new CRL should be generated, then a new CRL can be generated at 703. When referring to CRL, as previously noted, reference can be made in accordance with the present invention to a base CRL or a delta CRL. In the case where a delta CRL is generated or requested, it should be assumed that a recipient or a requester, such as an exemplary security client, also has previously requested and has the corresponding base CRL.

After the CRL is generated, that is, after all the information for the certificates that have been revoked since the generation of the last update is generated, the CRL contents can be filtered at 704 using a filter procedure and a header can be generated and maintained in an unfiltered form. At 705, the header (HDR) and filtered contents are provided to a compression procedure and compressed. The header can then include at least an indication that the contents are compressed and the type of compression used for example in embodiments where the contents are compressed in their entirety. In other embodiments where individual certificate serial numbers and information associated with the certificates such as certificate extensions as described above are separately compressed, the header can contain a location index of the records within the compressed portion of the CRL. The combination of the header and the filtered/compressed contents of the CRL can then be provided to a security client based on a request or, alternatively based on a periodic schedule such as that reflected in the last update/next update fields. While the exemplary procedure is indicated as ending at 706, it will be appreciated that all or portions of the procedure can be performed or repeated on an as-needed basis depending, for example, on the number of certificates revoked, the frequency of revocation and the like.

Figure 8:
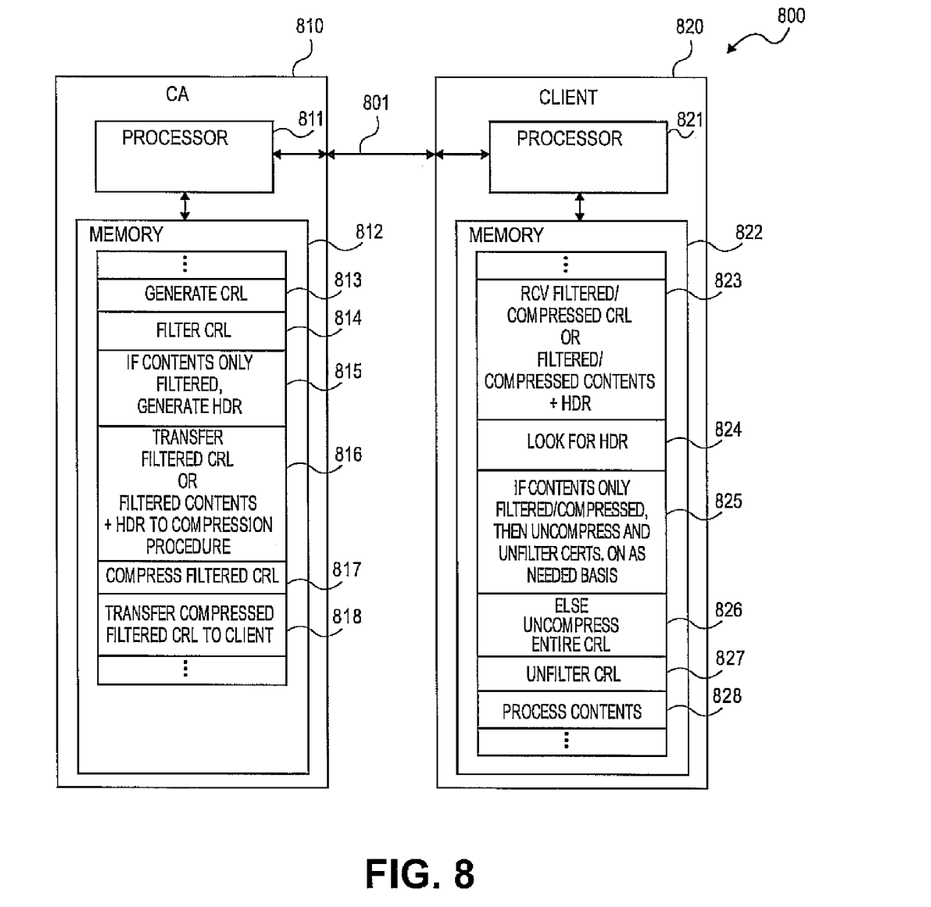
FIG. 8 is a block diagram illustrating portions of an exemplary CA and an exemplary client in accordance with the present invention.

It will be appreciated by those of ordinary skill that the present invention can be embodied, for example in scenario 800 as shown in FIG. 8, as one or more general purpose computer systems or dedicated computer systems having one or more processors, and memory or the like. The certificate authority (CA) 810 and client 820 can be connected with a link 801, such as a network connection. In various exemplary and alternative exemplary embodiments, the link 801 can include a connection from CA 810 to client 820, through a public network such as the Internet. Further, CA 810 can be linked through a public network to client 820 which may be associated with a private network. The link 801 can further be wired or wireless as will be appreciated or can be any combination of known methods to link a client and server. It will also be appreciated that the CA 810 and the client 820 may be equipped with network interface hardware (not shown) such as a network interface controller (NIC) or other circuit or device for providing connectivity. Still further, at a higher layer, basic security for the connection associated with link 801 can be facilitated, by the use of secure sockets layer (SSL) as would be appreciated.

In the exemplary scenario 800, the CA 810 and the client 820 can be loaded with software instructions, for example, in respective memory 812 and memory 822, for causing respective processors 811 and 821 to carry out various procedures in accordance with the invention. For example, CA 810 can execute instructions in the memory 811 to generate a CRL at 813 according to a schedule or request as described above. The CRL can be filtered at 814 and, if the contents only are being filtered, at 815 a header can be generated. The filtered CRL or the filtered contents including a header can be transferred at 816 to client 810, which can be for example a personal security environment (PSE) or the like. At 817, the filtered CRL may be compressed, and at 818 transferred to client 820. The client 820 can receive the filtered/compressed CRL or the filtered/compressed compressed CRL contents and uncompressed header at 823 and immediately look for the header at 824. The filtered/compressed CRL contents include a compressed certificate serial numbers and optional extensions associated with revoked certificates. At 825, if the contents only are filtered/compressed, then the certificates are uncompressed and unfiltered on an as needed basis. At 826, the entire CRL is alternatively uncompressed and at 827 unfiltered. At 828, the contents are then processed. It will be appreciated that in the case where the entire CRL is compressed, an indication should be provided to the client 820 that the CRL is compressed and the method of compression. Alternatively, the manner of compression can be known in advance. For example, CA 810 can provide an indication in its own certificate that it will be sending CRL in a compressed format and further indicate the type of compression used. One of ordinary skill will realize that additional security can be inherently provided by transferring a compressed CRL where the fact that the CRL is compressed and the manner of compression can only be known through legitimately obtaining a certificate from the CA 810.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is clamed is:

1. A method comprising:
   filtering at least a portion of a certificate revocation list (CRL) by a computing device running a certification authority (CA) using a filtering procedure that is reversible by a recipient of the CRL, wherein the filtering improves a compression ratio of a lossless compression procedure;
   compressing the filtered portion of the CRL except a header thereof using the lossless compression procedure, the compressing comprising compressing a serial number and a certificate extension of a revoked certificate identified in the CRL, wherein the compression ratio of the compressed portion of the CRL is improved as a result of the filtering; and identifying the filtering procedure, the lossless compression procedure and a location of the compressed portion in the header.

2. The method of claim 1, wherein filtering the at least a portion of the CRL comprises:
performing a run length encoding procedure on the at least a portion of the CRL; and
identifying information associated with the run length encoding procedure in the header.

3. The method of claim 1, wherein filtering the at least a portion of the CRL comprises:
performing a transform procedure on the at least a portion of the CRL; and
identifying information associated with the transform procedure in the header.

4. The method of claim 1, wherein filtering the at least a portion of the CRL comprises:
performing a sorting procedure on respective serial numbers of one or more certificates of the CRL; and
identifying information associated with the sorting procedure in the header.

5. The method of claim 1, wherein the certificate extension comprises one or more of an authority key identifier, an issuer alternative name, a CRL number, an issuing distribution point, a delta CRL indicator, a reason code, a certificate issuer, a reason for suspension, or an invalidity date.

6. The method of claim 1, wherein the CRL comprises one or more fields comprising one or more of a version field, a signature field, an issuer field, a present update date field, a next update date field, or a revoked certificates field.

7. The method of claim 1, wherein the CRL comprises an X.509 CRL and the one or more certificates comprise an X.509 certificate.

8. The method of claim 1, wherein reversing the filtering procedure comprises using a second filtering procedure that is an inverse to the filtering procedure to recreate, from the filtered portion, the portion as it existed prior to the filtering.

9. The method of claim 1, wherein the compressing is performed using a lossless compression procedure that performs statistical modeling to achieve compression.

10. A method comprising:
receiving, by a computing device executing a security client, a filtered and compressed certificate revocation list (CRL) that has been filtered using a reversible filtering procedure and compressed using a compression procedure, the filtered and compressed CRL comprising a header and a body having a serial number and a certificate extension of at least one certificate, wherein the reversible filtering procedure improves a compression ratio of the compression procedure, wherein a size of the filtered and compressed CRL is reduced as a result of the filtering procedure, and wherein the header has not been compressed;
examining the header of the filtered and compressed CRL to identify information associated with the filtering procedure, wherein the header identifies a location of compressed contents of the filtered and compressed CRL;
decompressing the filtered and compressed CRL to form a filtered CRL; and
accessing uncompressed contents of the filtered CRL based on reversing the filtering procedure using the information associated with the filtering procedure.

11. The method of claim 10, wherein:
the filtering procedure comprises a run length encoding procedure; and
the accessing the uncompressed contents comprises:
identifying information associated with the run length encoding procedure; and
accessing the uncompressed contents by performing a reverse run length encoding procedure on at least a portion of the uncompressed contents.

12. The method of claim 10, wherein:
the filtering procedure comprises a transform procedure; and
the accessing the uncompressed contents comprises:
identifying information associated with the transform procedure; and
accessing the uncompressed contents by performing a reverse transform procedure on at least a portion of the uncompressed contents.

13. The method of claim 10, wherein:
the filtered and compressed CRL comprises a plurality of certificates comprising a respective plurality of serial numbers;
the filtering procedure comprises a numerical sorting procedure on at least the respective plurality of serial numbers; and
the accessing the uncompressed contents comprises:
identifying information associated with the numerical sorting procedure; and
accessing the respective plurality of serial numbers by performing a numerical look-up procedure on at least a portion of the uncompressed contents based on the information associated with the numerical sorting procedure.

14. The method of claim 10, wherein the certificate extension comprises one or more of an authority key identifier, an issuer alternative name, a CRL number, an issuing distribution point, a delta CRL indicator, a reason code, a certificate issuer, a reason for suspension, or an invalidity date.

15. The method of claim 10, wherein the CRL comprises one or more fields comprising one or more of a version field, a signature field, an issuer field, an present update date field, a next update date field, or a revoked certificates field.

16. The method of claim 10, wherein the CRL comprises an X.509 CRL and the at least one certificate comprises an X.509 certificate.

17. A computer system comprising:
a first computing device comprising a secure network interface, a storage device storing a certificate revocation list (CRL) and a processor coupled to the storage device and the secure network interface, the processor to:
filter, using a filtering procedure that is reversible by a recipient of the CRL, at least a portion of the CRL, wherein the filtering procedure improves a compression ratio of a compression procedure;
compress the filtered portion except a header thereof using the compression procedure, the compressing comprising compressing a serial number and a certificate extension of a revoked certificate identified in the CRL, wherein the filtering of at least the portion of the CRL causes the compressed portion to have a smaller size than the compressed portion would have had if the filtering had not been performed; and
identify the filtering procedure and the compression procedure in the header, wherein the header identifies a location of the compressed portion.

18. The computer system of claim 17, wherein filtering the contents of the CRL comprises:
performing a run length encoding procedure on the contents of the CRL; and identifying information associated with the run encoding length procedure in the header.

19. The computer system of claim 17, wherein filtering the contents of the CRL comprises:
performing a transform procedure on the contents of the CRL; and
identifying information associated with the transform procedure in the header.

20. The computer system of claim 17, wherein filtering the contents of the CRL comprises:
performing a sorting procedure on the contents of the CRL; and
identifying information associated with the sorting procedure in the header.

21. The computer system of claim 17, wherein the certificate extension comprises one of an authority key identifier, an issuer alternative name, a CRL number, an issuing distribution point, a delta CRL indicator, a reason code, a certificate issuer, a reason for suspension, or an invalidity date.

22. The computer system of claim 17, wherein the CRL comprises one or more fields comprising one or more of a version field, a signature field, an issuer field, an present update date field, a next update date field, or a revoked certificates field.

23. The computer system of claim 17, wherein the CRL comprises an X.509 CRL and the at least one certificate comprises an X.509 certificate.

24. The computer system of claim 17, further comprising:
a second computing device, networked to the first computing device, having an additional processor to:
receive the CRL after the CRL has been filtered and compressed;
examine the header of the CRL to identify the filtering procedure;
decompress the CRL to form uncompressed contents thereof;
reverse the filtering procedure; and
access the uncompressed contents of the CRL.

25. A non-transitory computer readable storage medium having instructions that, when executed by a processor, cause the processor to perform a method comprising:
filtering at least a portion of a certificate revocation list (CRL) by the processor using a filtering procedure that is reversible by a recipient of the CRL, wherein the filtering improves a compression ratio of a lossless compression procedure;
compressing the filtered portion of the CRL except a header thereof using the lossless compression procedure, the compressing comprising compressing a serial number and a certificate extension of a revoked certificate identified in the CRL, wherein the compression ratio of the compressed portion of the CRL is improved as a result of the filtering; and
identifying the filtering procedure, the lossless compression procedure and a location of the compressed portion in the header.

26. The non-transitory computer readable storage medium of claim 25, wherein filtering the at least a portion of the CRL comprises:
performing at least one of a run length encoding procedure, a transform procedure or a sorting procedure on the at least a portion of the CRL; and
identifying information associated with at least one of the run length encoding procedure, the transform procedure or the sorting procedure in the header.

27. The non-transitory computer readable storage medium of claim 25, wherein one or more certificates of the CRL comprise an X.509 certificate having a certificate extension comprising one or more of an authority key identifier, an issuer alternative name, a CRL number, an issuing distribution point, a delta CRL indicator, a reason code, a certificate issuer, a reason for suspension, or an invalidity date.

* * * * *